United States Patent
Thieblin et al.

(10) Patent No.: US 6,337,020 B1
(45) Date of Patent: Jan. 8, 2002

(54) METHOD AND DEVICE FOR PURIFYING WASTE WATER COMPRISING AN ADDITIONAL SLUDGE TREATMENT BY OZONATION

(75) Inventors: Eric Thieblin, Plaisir; Roger Pujol, Chatou; André Haubry, Mezy sur Seine, all of (FR)

(73) Assignee: Societe Degremont (FR)

( * ) Notice: Subject to any disclaimer, the term of this patent is extended or adjusted under 35 U.S.C. 154(b) by 0 days.

(21) Appl. No.: 09/485,026

(22) PCT Filed: Jul. 24, 1998

(86) PCT No.: PCT/FR98/01647

§ 371 Date: Apr. 14, 2000

§ 102(e) Date: Apr. 14, 2000

(87) PCT Pub. No.: WO99/06327

PCT Pub. Date: Feb. 11, 1999

(30) Foreign Application Priority Data

Aug. 1, 1997 (FR) .............................. 97 09882

(51) Int. Cl.⁷ ................................................ C02F 3/02
(52) U.S. Cl. ...................... 210/627; 210/628; 210/760; 210/173
(58) Field of Search ................................. 210/627, 628, 210/760, 173

(56) References Cited

U.S. PATENT DOCUMENTS 6,000,551 A * 12/1999 Kanel
6,146,524 A * 11/2000 Story

FOREIGN PATENT DOCUMENTS

| DE | 2546756 | 4/1977 |
|---|---|---|
| DE | 4407564 | 9/1995 |
| EP | 0645347 | 3/1995 |
| FR | 2490208 | 3/1982 |
| GB | 1116570 | 6/1968 |
| JP | 2222798 | 9/1990 |
| WO | WO 9513990 | 5/1995 |

OTHER PUBLICATIONS

G. B. Saayman et al., "Chemical Control of Filamentous Sludge Bulking in a Full–scale Biological Nutrient Removal Activated Sludge Plant", "Proceedings of the first Australian conference of the International Ozone Association", vol. II, pp. III–61 to III–81.

Collignon et al., "Treatment of bulking by ozonation. Mechansims of ozone on microorganisms.", "Tribune de l'eau", No. 562–12, pp. 46–57.

* cited by examiner

Primary Examiner—Chester T. Barry
(74) Attorney, Agent, or Firm—Piper Marbury Rudnick & Wolfe

(57) ABSTRACT

Method for purifying waste water, whereby the waste water is subjected to a biological treatment producing sludge, part of this sludge being recycled towards the biological treatment while being subjected to ozonation combined with mechanical stirring. A mechanical stirring energy is brought in to attack the walls of the microorganisms.

14 Claims, 2 Drawing Sheets

Figure 1:
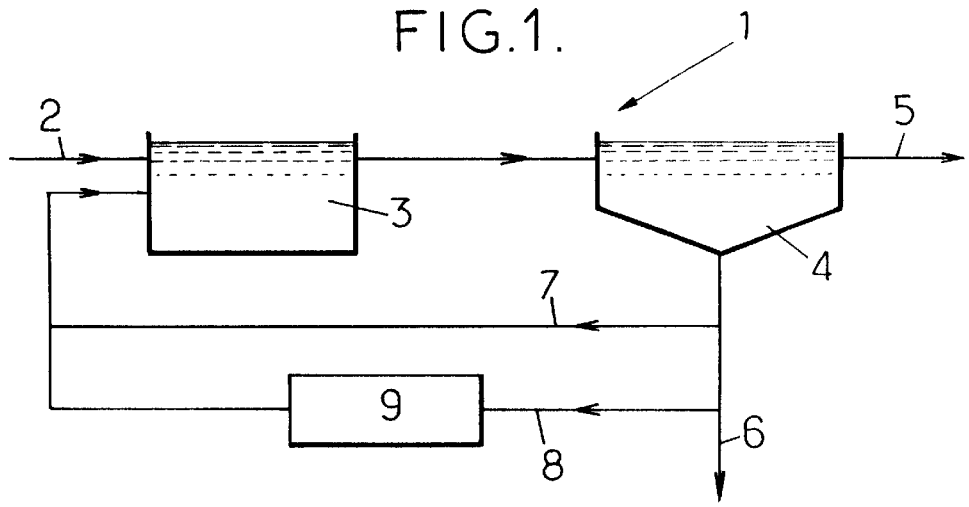

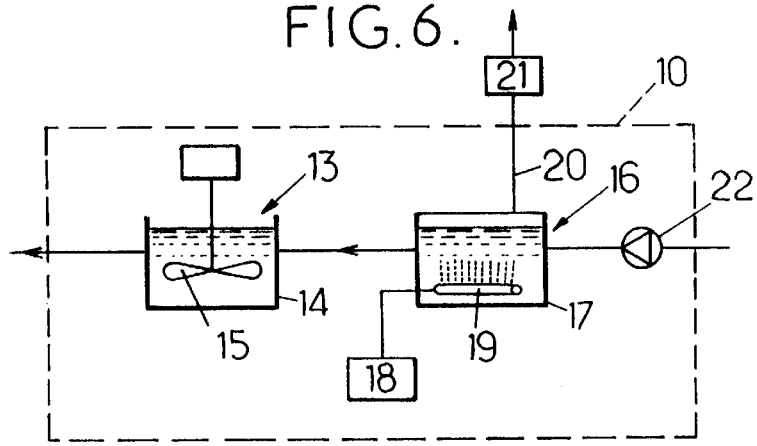
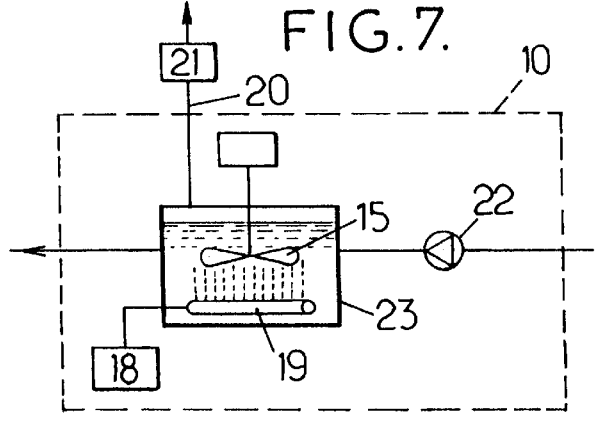
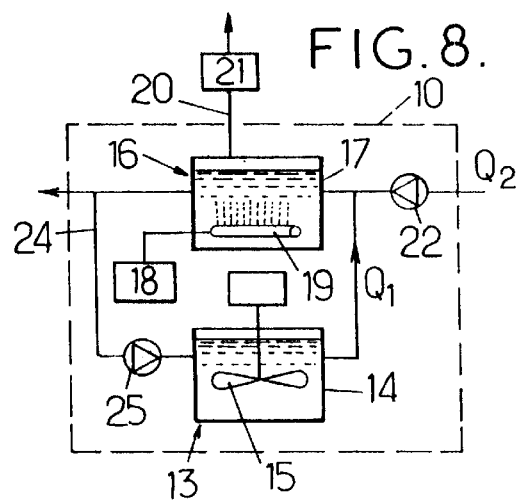
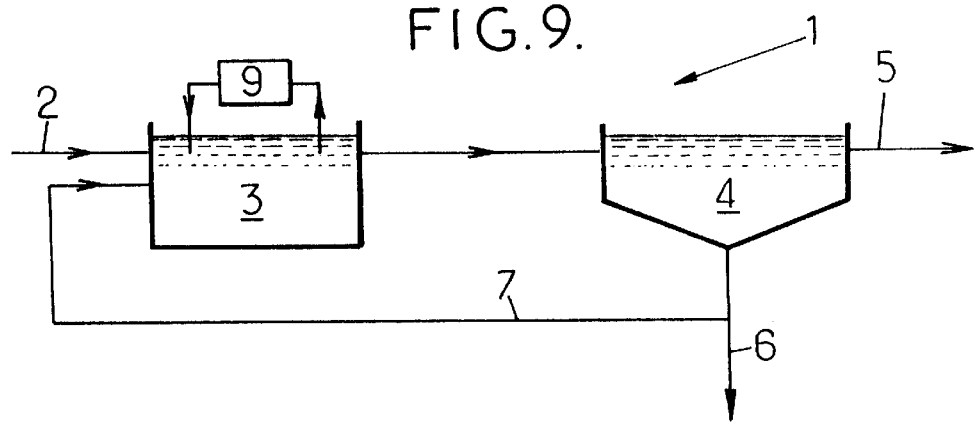

METHOD AND DEVICE FOR PURIFYING WASTE WATER COMPRISING AN ADDITIONAL SLUDGE TREATMENT BY OZONATION

The present invention relates to methods and systems for purifying waste water which include additional sludge treatment by ozonation to reduce significantly the quantities of sludge produced by a biological treatment system, in particular to reduce the cost of treating the sludge resulting from new regulations.

One advantage of said invention is to improve settling of the sludge after treatment.

The invention relates more particularly to a method of purifying waste water charged with organic materials, the method including a step in which the waste water remains in a biological treatment system, referred to as the main biological treatment system (consisting of one or more reactors such as aeration pools, bacteria beds, anaerobic digesters, clarifiers, etc. for biological treatment, possibly in conjunction with physical-chemical treatment), in which said organic materials are degraded by micro-organisms to produce sludge, some of the sludge being subjected to ozonation combined with mechanical stirring before it is sent to the main biological treatment system, the sludge subjected to ozonation in this way being referred to as "treated sludge".

Document EP-A-0 645 347 describes a method of the above kind in which ozonation takes place after acidifying the treated sludge to a pH less than 5, mechanical stirring being employed either during the acidification process to mix the treated sludge with an acidification reactant or by spraying some of the treated sludge into the ozonation reactor by means of a pump.

The method described in the above document has the drawbacks of requiring relatively large quantities of ozone and interfering with the operation of the main biological treatment system because of the acidification of the treated sludge One particular object of the present invention is to alleviate these drawbacks.

To this end, the invention proposes a method which is essentially characterized in that during the mechanical stirring step sufficient mechanical energy is imparted to said treated sludge to attack the walls of the micro-organisms contained in the treated sludge.

This improves the efficiency of the ozonation treatment compared to the process described in the document mentioned above because the mechanical stirring energy imparted to the treated sludge is sufficient to weaken the floc and the cell walls of the micro-organisms contained in said treated sludge to enable the ozone to attack the micro-organisms more efficiently. The floc is destroyed by attacking the exopolymers which account for the cohesion of said floc and this causes various bacteria and protozoa to burst.

Quantities of ozone significantly smaller than used in the method described in the document mentioned above can therefore be used.

Moreover, correct operation of the main biological treatment system is not interfered with because it is not necessary to acidify the treated sludge.

Furthermore, the efficiency of the ozonation process is further improved because the treated sludge does not have to be acidified.

Finally, recirculating the sludge to the main biological treatment system absorbs additional pollution generated when the cell walls of the micro-organisms are destroyed (increased chemical oxygen demand [COD], biochemical oxygen demand [BOD] and dissolved organic carbon), the final result being that the volume and mass of the sludge are greatly reduced, the indices of the sludge (in particular the Mohlmann index) are significantly improved and possible biological disorders (in particular "bulking" due to filamentary bacteria) are minimized.

One or more of the following features can be used in preferred embodiments of the invention:
- the pH of the treated sludge is always from 6 to 9;
- the treated sludge is mechanically stirred before its ozonation;
- the treated sludge is mechanically stirred after its ozonation;
- the mechanical stirring and the ozonation of the treated sludge take place in the same reaction enclosure;
- a particular flowrate of treated sludge, referred to as the first flowrate, is taken from the outlet of a treated sludge ozonation reactor, this first flowrate then being subjected to mechanical stirring, said first flowrate being then sent to the ozonation reactor with a particular additional flowrate of sludge from the main biological reactor, referred to as the second flowrate, the second flowrate being lower than the first flowrate;
- the treated sludge is subjected to aerobic or anaerobic digestion in addition to ozonation and mechanical stirring;
- the aerobic or anaerobic digestion takes place after ozonation and mechanical stirring;
- a particular flowrate of the treated sludge is taken from the outlet of a digester in which the treated sludge undergoes the aerobic or anaerobic digestion, this flowrate of treated sludge then being subjected to mechanical stirring and ozonation before it is sent to the digester with a particular additional flowrate of sludge from the main biological reactor;
- the main biological treatment system is sent only some of the treated sludge that has been subjected to aerobic or anaerobic digestion and further treated sludge leaving the digester is evacuated;
- the ozonation step is implemented in an ozonation reactor which includes at least one vent from which exits a gaseous effluent including at least ozone and oxygen, the method further including a step of collecting this gaseous effluent and re-using said gaseous effluent to treat the waste water or other liquid resulting from the treatment of the waste water;
- the ozone contained in the gaseous effluent collected from the outlet of the vent is destroyed thermally or catalytically before said gaseous effluent is re-used;
- the mechanical stirring energy is from 10 kJ to 20,000 kJ per kg of dry material of the treated sludge;
- the mechanical stirring energy is from 50 kJ to 3,000 kJ per kg of dry material of the treated sludge.

The invention also provides a system for implementing a method as defined hereinabove, the system including a pressurized ozonation reactor in which the treated sludge is subjected to ozonation.

Other features and advantages of the invention will become apparent in the course of the following description of several embodiments of the invention given by way of non-limiting example and with reference to the accompanying drawings.

IN THE DRAWINGS

Figure 2:
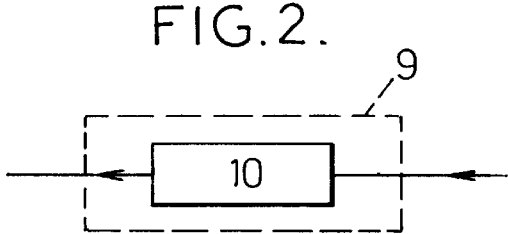
Figure 3:
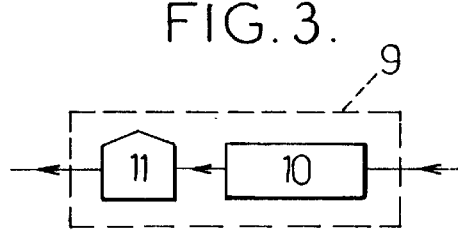
Figure 4:
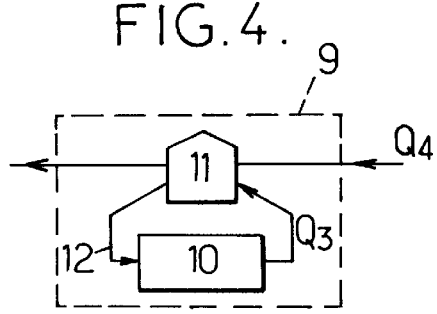

FIG. 1 is a diagrammatic view of an installation for treating waste water using one embodiment of a method in accordance with the invention, FIGS. 2 to 4 are diagrams showing in more detail the content of the box 9 in FIG. 1, FIGS. 5 to 8 are diagrammatic views showing in more detail the content of the box 10 from FIGS. 2 to 4, in which ozonation and mechanical stirring of the treated sludge are combined, and FIG. 9 is a view similar to FIG. 1 for a different embodiment of the invention.

In the various figures, the same reference symbols designate identical or similar elements.

FIG. 1 is a highly diagrammatic representation of a station 1 for purifying waste water, the station including:
- an inlet 2 for waste water charged with organic material,
- one or more biological treatment reactors, for example an aeration pool 3 in which said organic materials are degraded by micro-organisms to produce sludge, the aeration pool 3 possibly being associated with or replaced by one or more other biological treatment systems such as fixed culture reactors, anaerobic digesters, etc.,
- a clarifier 4, or any other solids-liquids separator system, which receives the waste water after it has passed through the aeration pool 3 and which separates the water and the sludge,
- a treated water outlet 5 which collects the water from the outlet of the clarifier 4,
- a sludge outlet 6 which collects the sludge from the outlet of the clarifier 4,
- a first recycling loop 7 which collects some of the sludge from the outlet 6 and recycles it to the inlet of the aeration pool 3, this first recycling loop 7 possibly being dispensed with (this loop can carry a flowrate representing from 50% to 300% of the nominal flowrate of the urban or industrial effluent treated by the purifying station, for example), and
- a second sludge degrading loop 8 which also collects some of the sludge from the outlet 6 and feeds it to the inlet of the aeration pool 3 via a sludge treatment system 9 in which said sludge is subjected to at least one combined treatment of ozonation and mechanical stirring.

As shown in FIGS. 2 to 4, the sludge treatment system 9 can include:
- only an ozonation and mechanical stirring system 10 (FIG. 2), or
- an aerobic or anaerobic digester 11 downstream of an ozonation and mechanical stirring system 10 (FIG. 3), some of the sludge leaving the digester 11 possibly being evacuated rather than recycling all of the sludge to the inlet of the aeration pool 3, or
- an anaerobic digester 11 including a recirculation loop 12 (FIG. 4) into which an ozonation and mechanical stirring system 10 is integrated, the flowrate Q4 of sludge at the sludge outlet 6 being generally less than the flowrate Q3 of the sludge in the recycling loop 12 between the inlet and the outlet of the digester 11 (as in the case of FIG. 3, some of the sludge leaving the digester 11 can be evacuated rather than recycling all of the sludge to the inlet of the aeration pool 3).

Figure 5:
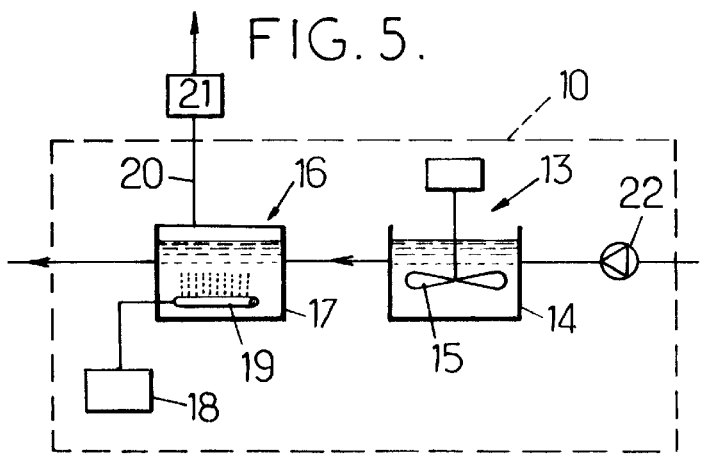

As shown in FIG. 5, the ozonation and mechanical stirring system 10 includes a mechanical stirrer 13 generally consisting of an enclosure 14 including one or more turbines 15, or possibly dynamic mixers, hydro-ejectors, kneaders or any other mechanical stirring system.

Note that ultrasound is regarded as a physical phenomenon (generation of acoustic waves) and therefore is not included in the category of "mechanical" phenomena in the context of the present invention, using moving systems.

The power of the mechanical stirring system is chosen so that the sludge treatment system 9 preferably dissipates a mechanical stirring energy from 10 kJ/kg to 2,000 kJ/kg of dry material of the treated sludge (typically 600 kJ/m$^3$ to 3,600 kJ/m$^3$ of treated sludge), which energy can be as high as 20,000 kJ/kg of dry material (typically 14,000 kJ/m$^3$ of treated sludge). The preferred range of mechanical energy runs from 50 kJ/kg to 3,000 kJ/kg of dry material.

Also, the ozonation and mechanical stirring system 10 includes an ozonation reactor 16 which generally consists in a closed enclosure 17 which receives the sludge to be treated and into which ozone from an ozoner 18 is injected via injection nozzles 19 (which can be replaced with porous diffusers, hydro-ejectors or the like), these nozzles being coupled to static or dynamic mixers if necessary.

The overall consumption of ozone is preferably from 0.001 g to 0.02 g of ozone per gram of dry material in the treated sludge passing through the sludge treatment system 9 (if the treated sludge were passed several times through the ozonation reactor 16, the above-mentioned ozone consumption would be the total consumption for all passes of the sludge through the ozonation reactor).

The enclosure 17 can be pressurized, if required, in which case it is the subject of appropriate structural design calculations.

Moreover, the enclosure 17 includes a vent 20 from which exits a gaseous effluent containing at least oxygen and ozone not consumed by treating the sludge. If necessary, the vent 20 can be connected to a system 21 for destroying the ozone by heating it or by passing it over activated carbon, or said gaseous effluent can instead be re-used at any point of the purifying station. For example, it can be injected into the waste water at the inlet of the aeration pool 3 or brought into contact with any other liquid resulting from the treatment of the waste water (waste water at the outlet from the aeration pool or at the outlet from the clarifier, etc.).

The mechanical stirrer 13 and the ozonation reactor 16 are generally fed with sludge by a pump 22 which can if necessary contribute to the mechanical stirring of the sludge, in which case the pump 22 is advantageously a centrifugal pump.

In this case, the mechanical stirring energy imparted to the sludge by the stirrer 13 can if necessary be less than 10 kJ/kg of dry material in the treated sludge (600 kJ/m$^3$ of treated sludge), provided that the sum of this mechanical stirring energy plus the mechanical energy imparted to the sludge by the pump 22 is from 10 kJ/kg to 2,000 kJ/kg of dry material in the treated sludge (600 kJ/m$^3$ to 14,400 kJ/m$^3$ of treated sludge).

Of course, the mechanical stirrer 13 and the ozonation reactor 16 are not necessarily disposed as shown in FIG. 5; instead, as shown in FIGS. 6 to 8:
- the ozonation reactor 16 could be upstream of the mechanical stirrer 13 (FIG. 6),
- the turbine 15 or other mechanical stirring system could be in the ozonation reactor 33 itself (FIG. 7), this reactor having characteristics similar to the ozonation reactor 16 previously described,
- the mechanical stirrer 13 could be installed on a recirculation loop 24 which takes a flowrate Q1 of sludge from the outlet of the ozonation reactor 16 and feeds that flowrate Q1 back to the inlet of said reactor, the flowrate Q2 of sludge taken from the sludge outlet 6 and joining the flowrate Q1 at the inlet of the ozonation reactor generally being less than the flowrate Q1 and the recirculation loop 24 generally being provided with a pump 25 which can if necessary contribute to the mechanical stirring of the sludge, as previously described for the pump 22.

Finally, as shown in FIG. 9, the sludge treatment system 9, along with all its variants previously described, could take sludge from the aeration pool 3 and return the treated sludge to the same aeration pool.

More generally, the sludge treatment system 9 could take sludge to be treated from anywhere in the purifying station after at least one biological treatment of the waste water and return at least some of the treated sludge to that biological treatment.

Finally, note that the treated sludge is not subjected to acidification at any time, the pH of the sludge always remaining greater than 5, and preferably from 6 to 9, so that re-injecting the sludge into the biological treatment stage of the purification station does not interfere with said biological treatment.

What is claimed is:

1. Method of purifying waste water charged with organic materials, the method including a step in which the waste water remains in a biological treatment system, referred to as the main biological treatment system, in which said organic materials are degraded by micro-organisms to produce sludge, some of the sludge being subjected to ozonation combined with mechanical stirring before it is sent to the main biological treatment system, the sludge subjected to ozonation in this way being referred to as treated sludge, wherein during the mechanical stirring step sufficient mechanical energy is imparted to said treated sludge to attack the cell walls of the bacteria and other micro-organisms contained in the treated sludge, this mechanical energy being from 50 kJ/kg to 3,000 kJ/kg of dry material in the treated sludge, and wherein from 0.001 g to 0.2 g of ozone per gram of dry material in the treated sludge are consumed during the ozonation step.

2. Method according to claim 1, wherein the pH of the treated sludge is always from 6 to 9.

3. Method according to claim 1, wherein the treated sludge is mechanically stirred before its ozonation.

4. Method according to claim 1, wherein the treated sludge is mechanically stirred after its ozonation.

5. Method according to claim 1, wherein the mechanical stirring and the ozonation of the treated sludge take place in the same reaction enclosure.

6. Method according to claim 1, wherein a particular flowrate of treated sludge, referred to as the first flowrate, is taken from the outlet of an ozonation reactor in which the treated sludge is subjected to ozonation, this first flowrate is then subjected to mechanical stirring, and said first flowrate is then sent to the ozonation reactor with a particular additional flowrate of sludge from the main biological reactor, referred to as the second flowrate, the second flowrate being lower than the first flowrate.

7. Method according to claim 1, wherein the treated sludge is subjected to aerobic or anaerobic digestion in addition to ozonation and mechanical stirring.

8. Method according to claim 7, wherein the aerobic or anaerobic digestion takes place after ozonation and mechanical stirring.

9. Method according to claim 7, wherein a particular flowrate of the treated sludge is taken from the outlet of a digester in which the treated sludge undergoes the aerobic or anaerobic digestion and this flowrate of treated sludge is then subjected to mechanical stirring and ozonation before it is sent to the digester with a particular additional flowrate of sludge from the main biological reactor.

10. Method according to claim 7, wherein the main biological treatment system is sent only some of the treated sludge that has been subjected to aerobic or anaerobic digestion and further treated sludge leaving the digester is evacuated.

11. Method according to claim 1, wherein the ozonation step is implemented in a ozonation reactor which includes at least one vent from which exits a gaseous effluent including at least ozone and oxygen, the method further including a step of collecting this gaseous effluent and re-using said gaseous effluent to treat the waste water or other liquid resulting from the treatment of the waste water.

12. Method according to claim 11, wherein the ozone contained in the gaseous effluent collected from the outlet of the vent is destroyed before said gaseous effluent is re-used.

13. Method according to claim 1, wherein the treated sludge is subjected to ozonation in a pressurized ozonation reactor.

14. Method according to claim 1, wherein the waste water is subjected to a clarification step after passing through the main biological treatment system and in which at least the sludge to be treated by ozonation and mechanical stirring is separated from said waste water.

* * * * *